United States Patent Office 3,018,698
Patented Jan. 30, 1962

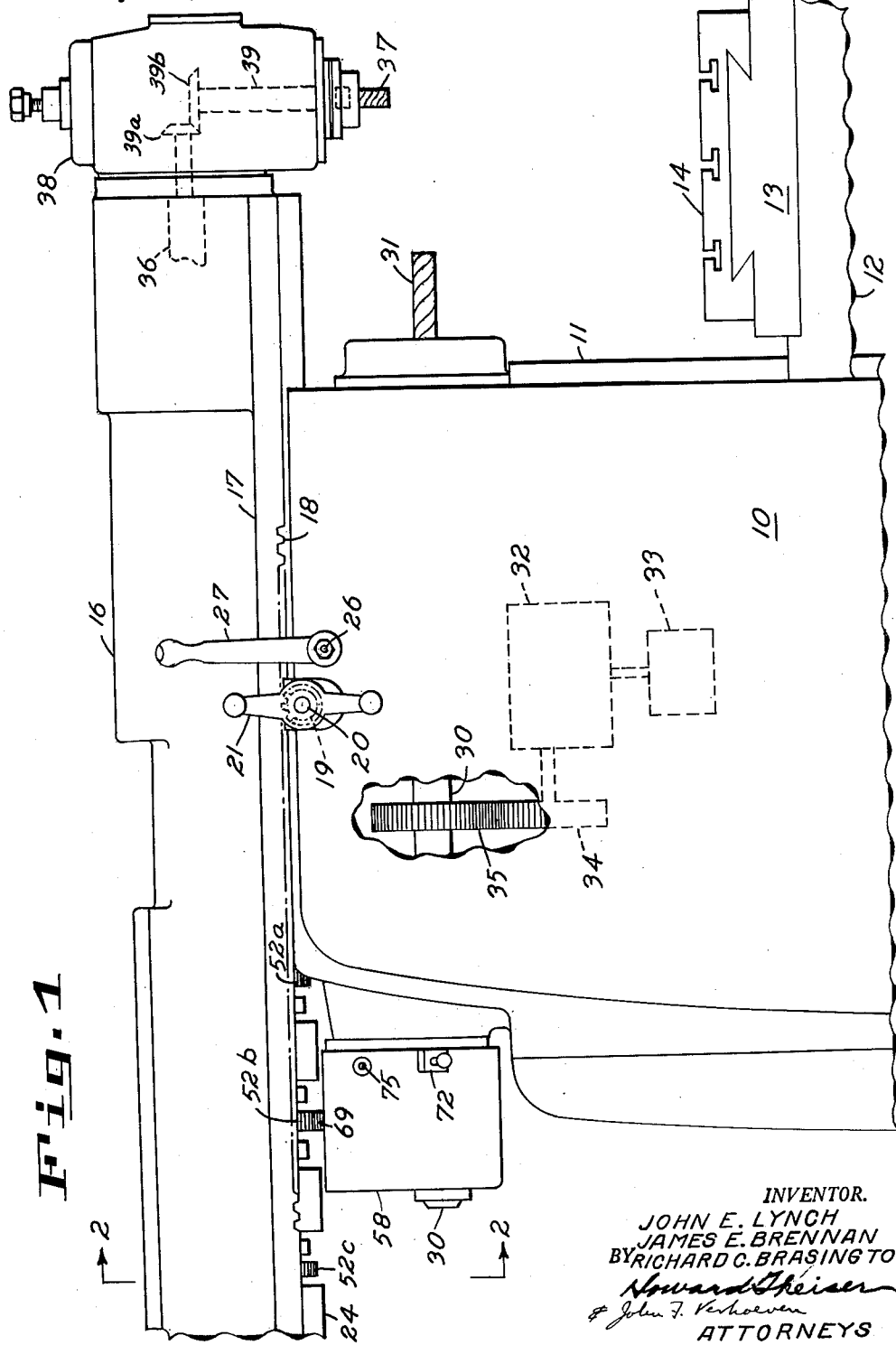
Jan. 30, 1962    J. E. LYNCH ET AL    3,018,698
MACHINE TOOL AUXILIARY SPINDLE DRIVE
Filed Sept. 22, 1959    2 Sheets-Sheet 1
INVENTOR.
JOHN E. LYNCH
JAMES E. BRENNAN
BY RICHARD C. BRASINGTON
Howard Theiser
& John F. Verhoeven
ATTORNEYS

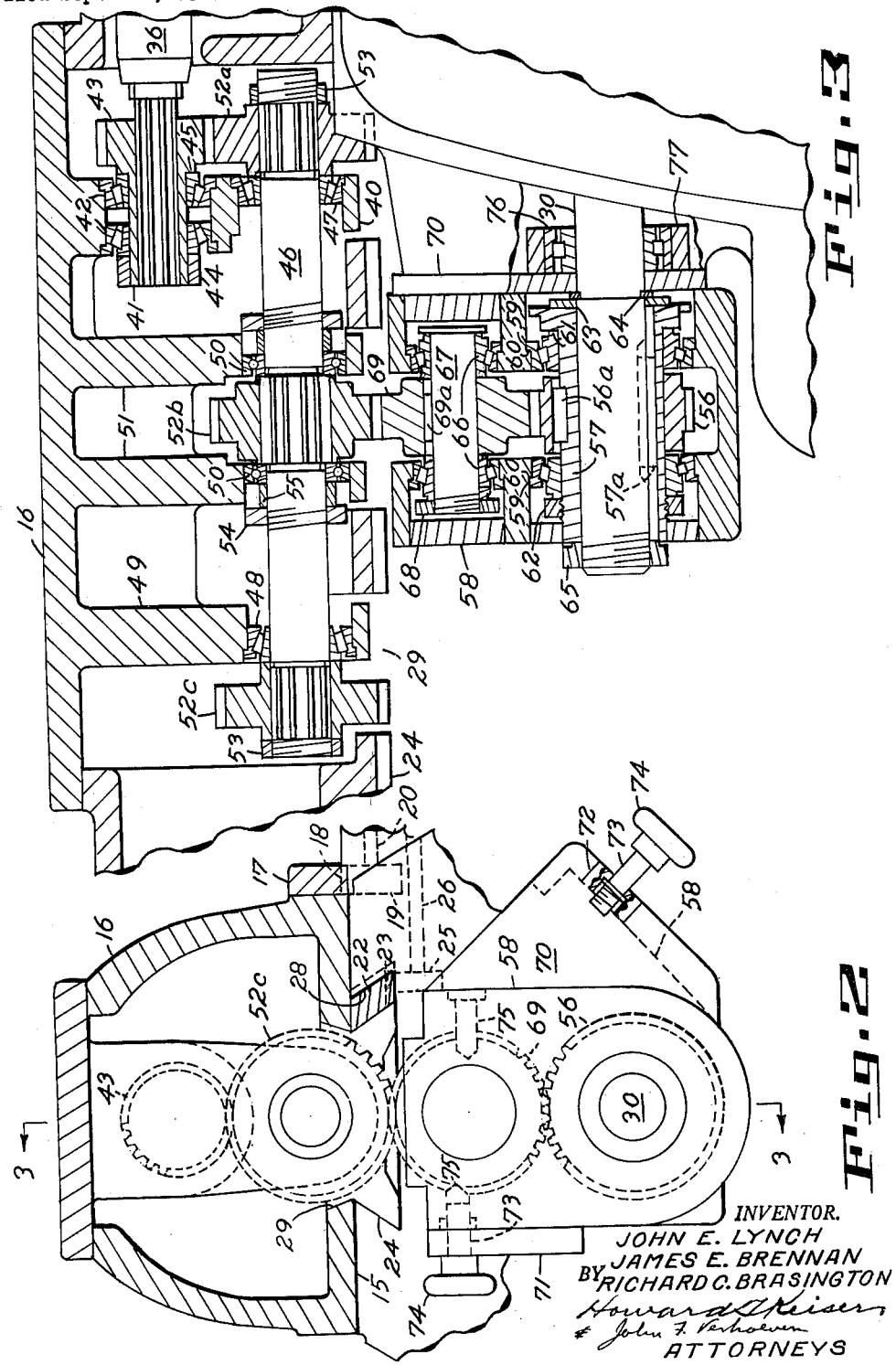

3,018,698
MACHINE TOOL AUXILIARY SPINDLE DRIVE
John E. Lynch, James E. Brennan, and Richard C. Brasington, Cincinnati, Ohio, assignors to The Cincinnati Milling Machine Co., Cincinnati, Ohio, a corporation of Ohio
Filed Sept. 22, 1959, Ser. No. 841,473
2 Claims. (Cl. 90—16)

The present invention relates to a machine tool, such as a milling machine, having an auxiliary cutter in addition to the main cutter and, more particularly, to the drive for said auxiliary cutter.

In a machine tool such as a milling machine a relatively complex transmission is provided in the drive system for the main cutter to provide a wide range of selected cutter speeds. When an auxiliary cutter is provided to expand the capacity of the machine, generally less power and a considerably less extended range of cutter speeds is provided since the auxiliary cutter is generally used only for special operations which can't be handled by the main cutter.

In the present invention there is provided a simple, rigid, inexpensive, mechanism by which power and a range of speeds, comparable to that transmitted to the main cutter, is transmitted to the auxiliary cutter. This is accomplished by providing means to selectively connect a shaft which drives the auxiliary cutter to the spindle which drives the main cutter whereby the full range of speed and power of the main cutter spindle is available at the shaft which drives the auxiliary cutter. In the preferred form of the invention this connection is made by a novel gear train which can selectively engage the main spindle with the shaft despite axial shifting of said shaft to selected positions to position the cutter driven thereby relative to the workpiece.

It is therefore one object of the present invention to provide an improved, rigid, mechanism for supplying a wide range of power and speeds to an auxiliary cutter in a machine tool. It is another object of the present invention to provide improved means in a milling machine to selectively connect an axially shiftable shaft which drives an auxiliary cutter to the main spindle thereof. Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In the drawings:
FIG. 1 is a side view in elevation of a milling machine embodying the present invention;
FIG. 2 is a view taken on line 2—2 of FIG. 1; and
FIG. 3 is a view taken on line 3—3 of FIG. 2.

The milling machine of FIG. 1 has an upstanding column 10 having vertical ways 11 which slidably receive the vertically movable knee 12. A saddle 13, mounted on the knee 12 and movable thereon towards and away from the column, supports a reciprocating table 14 upon which the workpieces are clamped. On top of the column are horizontal ways 15 upon which an elongated overarm housing 16, having a dovetail 24 received in the column, is movably mounted. The overarm has rack 17 connected on one side which has rack teeth 18 engaged by pinion 19. The pinion 19 is keyed to a shaft 20 journaled in the column 10. A lever 21 is keyed to shaft 20 outside the column so that by rotation of the lever the overarm is shifted longitudinally on the column. The overarm 16 can be clamped in selected positions on the column by means of a wedge shaped gib 22 having a toothed rack 23 engaged with pinion 25. The wall 28 of the column at the gib slopes in the longitudinal direction and the gib, when shifted longitudinally by rotation of pinion 25, clamps the dovetail 24 in the column. Pinion 25 is keyed to shaft 26 which is journaled in the column 10 and has a lever 27 connected to one end outside the column.

A main spindle 30 is rotatably mounted horizontally in the column by bearings (not shown) at the forward end and by bearing 76 mounted in sleeve 77 secured to the inner face of rear plate 70. The spindle 30 has the main cutter 31 operatively connected by conventional means to one end, the opposite end of the spindle 30 extending out of the column beyond the rear plate 70 as shown in FIG. 3. The main spindle 30 is operatively connected by gears 34 and 35 to a transmission, shown schematically at 32, for rotation at selected speeds by a motor, indicated schematically at 33. A shaft 36 is rotatably mounted in the overarm parallel to the main spindle and serves to drive the auxiliary cutter 37. The cutter 37 may be conventionally connected to an auxiliary spindle 39 which is mounted in a head 38 and connected to the shaft 36 by bevel gears 39a and 39b. The head 38 can be swiveled on the overarm 16 to orient the auxiliary spindle 39 at any desired angle in the vertical plane. If greater flexibility in the orientation of the auxiliary spindle is desired an intermediate member (not shown) having a vertical face connected to the end face of the overarm for swiveling thereon and having a face normal to said face to receive the head 38 for swiveling thereon can be utilized.

The forward end of shaft 36 is conventionally mounted in bearings (not shown) and the rear end has a sleeve 41 splined thereto (see FIG. 3) which is rotatably mounted in a depending web 40 of the overarm by a pair of spaced antifriction bearings 42 mounted in opposite faces of the web. On one side of the web the sleeve has a gear 43 integral therewith having a shoulder 45 engaged with one of the bearings 42. On the opposite side of the web the sleeve has a collar 44 secured thereon and in engagement with the other bearing 42.

A shaft 46 is mounted in the overarm parallel to, and below, shaft 36, the shaft 46 being carried at its ends in antifriction bearings 47 and 48 mounted, respectively, in the outer faces of web 40 and another depending web 49. Centrally, the shaft is carried in antifriction bearings 50 mounted in spaced depending webs 51. Splined to shaft 46 are three gears 52a, 52b, and 52c, the gears 52a and 52c outboard of webs 40 and 49, respectively, and the gear 52b between webs 51. Collars 53 outboard of gears 52a and 52c hold those gears against the bearings 47 and 48, which abut against shoulders in webs 40 and 49, to prevent longitudinal shifting of shaft 46 within the overarm. The gear 52b is engaged by the bearings 50 which are held thereagainst by spacers 55 and collars 54. The lower wall and dovetail which define the base of the overarm housing is slotted at the gears, as at 29, to permit engagement thereof from beneath the overarm, the base between the slots defining stiffener ribs extending across the housing to strengthen the housing in this region and to provide rigid resistance to clamping action. The gear 52a is engaged with the gear 43 splined to shaft 36 so that when any one of the gears 52a, 52b, or 52c, which may, for convenience, be designated as driven gears, is driven shaft 36 will be driven and, in turn, the auxiliary spindle and cutter will be driven.

A gear 56, which may be designated as a drive gear, is keyed at 56a to a sleeve 57 which, in turn, is keyed to the main spindle 30 at 57a. A housing 58 is carried by antifriction bearings 59 mounted on sleeve 57 on each side of gear 56. Spaced shoulders 60 of the housing are held between shoulders on bearings 59 and the bearings are held against longitudinal shifting on the sleeve between the sleeve shoulder 61 and collar 62. The sleeve 57 is held on the spindle 30 between washer 63 and lock ring 64 on one side of the sleeve and the collar 65 on the opposite side thereof. With this construction the housing 58 is swingable on bearings 59 about the main spindle 30. The housing has a pair of antifriction bearings 66 mounted therein, spaced from the spindle 30, and engaged with shoulders in the housing in the same manner as bearings 59. The bearings 66 carry a stub shaft 67 having a head at one end and a collar at the other end engaged with the outer faces of the bearings. Keyed to the stub shaft 66 at 69a, is an idler gear 69 engaged with the drive gear 56.

The housing 58 is swingably carried on the main spindle in sliding engagement with the plate 70 connected to the rear of column 10. Two spaced blocks 71 and 72 are welded to plate 70 and extend rearwardly therefrom defining predetermined limits to the swinging movement of the housing 58 about the main spindle 30. When the overarm is shifted longitudinally to a selected position where one of the driven gears 52a, 52b, or 52c is in registration with the drive gear 56 on spindle 30, the housing 58, which defines a swingable arm for the idler gear 69, can be swung counterclockwise, as viewed in FIG. 2, against block 71 to the position shown in solid lines in FIG. 2. With the housing in this position, the idler gear 69, which is continuously engaged with drive gear 56, will engage whichever driven gear 52a, 52b or 52c is in registration with the drive gear. The drive gear 56, the idler or intermediate gear 69, and the driven gear 52a, 52b, or 52c will be in vertical alignment at this time.

A shaft 73 having knob 74 is journaled in block 71 and has a threaded portion which can be screwed into the tapped hole 75 in the housing to secure the housing 58 against the block 71 in the driving position. The housing 58, when released from block 71, can be swung clockwise, as viewed in FIG. 2, to the position shown in dotted lines, against block 72, to disengage the idler gear 69 from the driven gear with which it was engaged, thereby disconnecting the shaft 36 and auxiliary spindle 39 from the main spindle 30. The housing 58 can be secured in the disengaged position against block 72 by means similar to those described in conjunction with block 71.

When normal machining operations are performed on the workpiece which can be accomplished by the cutter 31 the shaft 36 and auxiliary spindle 39 are disconnected from the main spindle. If an operation can be more conveniently performed by the cutter 37, the overarm is longitudinally positioned by lever 21 to a convenient operating position where one of the gears 52a, 52b, or 52c is in registration with the drive gear 56 within the housing 58, the cutter 31 being removed if it interferes with the workpiece. The saddle 13 can be shifted towards or away from the column to precisely position the workpiece relative to the cutter 37. The housing is released from block 72 and swung up against block 71, the gear 69 engaging the driven gear in registration therewith. The housing 58 is then clamped in this drive position and the auxiliary spindle is thereafter driven through the main spindle. Thus all the power and range of spindle speeds designed for the main spindle is available for driving the auxiliary spindle and cutter 37.

What is claimed is:

1. In a milling machine having an upstanding column, a main spindle rotatably mounted in the column, and means to drive the main spindle at selected speeds, the combination of an elongated housing mounted on the column for longitudinal movement parallel to the main spindle, said housing having a plurality of longitudinally spaced slots therein, an auxiliary spindle rotatably mounted in the housing for movement therewith, a plurality of driven gears mounted in the housing and extending, respectively, through the slots therein, said gears operatively connected to the auxiliary spindle, a drive gear mounted on the main spindle, and a swingable arm having an idler gear mounted thereon, said arm selectively swingable from an inoperative position to a position connecting said drive gear to one of said driven gears.

2. In a milling machine having an upstanding column, a main spindle rotatably mounted in the column, and means to drive the main spindle at selected speeds, the combination of means defining a dovetailed way on top of the column extending parallel to the main spindle, an elongated overarm housing having a dovetailed base received in the ways for longitudinal movement therein, said base having a plurality of longitudinally spaced slots therein, the base between the slots defining stiffener ribs extending across the housing, an auxiliary spindle rotatably mounted in the overarm housing for movement therewith, a plurality of driven gears mounted in the overarm housing and extending, respectively, through the slots therein, said gears operatively connected to the auxiliary spindle, a drive gear mounted on the main spindle, means to clamp the base of the overarm housing in predetermined longitudinally spaced operating positions in the column way, one of said driven gears positioned in predetermined relation with the drive gear in each of said operating positions, a housing mounted on the main spindle having an idler gear carried therein to connect the drive gear to the driven gear positioned in said predetermined relation thereto when the overarm housing is in one of said operating positions, said idler gear housing selectively swingable about the main spindle to an inoperative position for disengagement of the idler gear from said driven gear, and means to move the overarm housing longitudinally on the column between said operating positions when said clamping means is released.

References Cited in the file of this patent

UNITED STATES PATENTS

| | | |
|---|---|---|
| 1,791,758 | Goetz | Feb. 10, 1931 |
| 2,175,592 | Bennett | Oct. 10, 1939 |
| 2,657,616 | Armitage | Nov. 3, 1953 |